United States Patent
Andic et al.

(10) Patent No.: US 12,461,269 B2
(45) Date of Patent: Nov. 4, 2025

(54) FLUID DENSITY AND VISCOSITY MEASUREMENT TOOL WITH NOISE CANCELLATION

(71) Applicant: Schlumberger Technology Corporation, Sugar Land, TX (US)

(72) Inventors: Hikmet Andic, Paris (FR); Stephane Hoareau, Clamart (FR); Arsene Villemin, Versailles (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 77 days.

(21) Appl. No.: 17/932,374

(22) Filed: Sep. 15, 2022

(65) Prior Publication Data

US 2024/0111068 A1    Apr. 4, 2024

(51) Int. Cl.
*G01V 1/50* (2006.01)
*G01V 1/18* (2006.01)
*G01V 1/46* (2006.01)
*G01V 1/52* (2006.01)

(52) U.S. Cl.
CPC ............... *G01V 1/50* (2013.01); *G01V 1/18* (2013.01); *G01V 1/46* (2013.01); *G01V 1/523* (2013.01); *G01V 2210/624* (2013.01)

(58) Field of Classification Search
None
See application file for complete search history.

(56) References Cited

U.S. PATENT DOCUMENTS

| | | | | |
|---|---|---|---|---|
| 5,448,531 A | * | 9/1995 | Dragoset, Jr. | G01V 1/364 367/24 |
| 7,874,199 B2 | * | 1/2011 | Chaudoreille | G01N 9/002 73/32 A |
| 7,958,772 B2 | * | 6/2011 | Permuy | G01N 9/002 73/32 A |

(Continued)

FOREIGN PATENT DOCUMENTS

EP    1804048 A1    7/2007

OTHER PUBLICATIONS

Aarti Singh, 2001, Adaptative Noise Cancellation, 1/ECE/97 Dept. of Electronics & Communication Netaji Subhas Institute of Technology (52 pages).

*Primary Examiner* — Isam A Alsomiri
*Assistant Examiner* — Vikas Atmakuri
(74) *Attorney, Agent, or Firm* — Jeffrey D. Frantz

(57) ABSTRACT

A system including a sensor housing including a channel, and cantilever beam connected to the sensor housing and disposed within the channel. The system also includes an actuator connected to the cantilever beam and configured to cause the cantilever beam to vibrate. A sensor is connected to the cantilever beam and is configured to generate a first signal representing a cantilever beam vibration of the cantilever beam. The system also includes an accelerometer connected to at least one of the sensor and the sensor housing, the accelerometer configured to generate a second signal representing an external vibration of the sensor housing. The external vibration changes the cantilever beam vibration. The system also includes a signal processor configured to receive, as input, the first signal and the second signal and to generate, as output, a filtered signal that reduces an effect of the external vibration on the cantilever beam vibration.

18 Claims, 9 Drawing Sheets

(56) References Cited

U.S. PATENT DOCUMENTS

| | | | |
|---|---|---|---|
| 8,750,075 B2* | 6/2014 | Rayssiguier | E21B 47/16 |
| | | | 367/81 |
| 9,823,265 B2* | 11/2017 | Valsvik | G01P 15/0802 |
| 2008/0257036 A1* | 10/2008 | Chaudoreille | G01N 9/002 |
| | | | 73/32 A |
| 2015/0075279 A1* | 3/2015 | Donzier | G01N 11/16 |
| | | | 73/32 A |
| 2020/0182680 A1* | 6/2020 | Chennupati | G01S 7/527 |

* cited by examiner

FLUID DENSITY AND VISCOSITY MEASUREMENT TOOL WITH NOISE CANCELLATION

BACKGROUND

During natural resource production, a wellbore may be drilled into the ground. At one or more points along the wellbore a subsurface fluid may be encountered (e.g., oil, water, etc.).

In some cases, it may be desirable to quantitatively characterize the fluid. One technique for quantitatively characterizing the fluid is to vibrate a cantilever beam disposed within the fluid. The vibrations of the cantilever beam may be measured over time, and various physical characteristics of the fluid (viscosity, pressure, etc.) are determined based on the resulting cantilever beam vibration signal generated from the vibration of the cantilever beam.

However, other vibrations may be present that are external to the vibrations of the cantilever beam. For example, drilling equipment directly or indirectly in contact with the cantilever beam may vibrate as a result of possibly many external forces. The external vibrations cause noise in the cantilever beam vibration signal. The noise may exceed the signal, or otherwise make processing the signal less accurate.

SUMMARY

The one or more embodiments provide for a system. The system includes a sensor housing including a channel. The system also includes a cantilever beam connected to the sensor housing and disposed within the channel. The system also includes an actuator connected to the cantilever beam and configured to cause the cantilever beam to vibrate. The system also includes a sensor connected to the cantilever beam and configured to generate a first signal representing a cantilever beam vibration of the cantilever beam. The system also includes an accelerometer connected to at least one of the sensor and the sensor housing, the accelerometer configured to generate a second signal representing an external vibration of the sensor housing. The external vibration changes the cantilever beam vibration. The system also includes a signal processor configured to receive, as input, the first signal and the second signal and to generate, as output, a filtered signal that reduces an effect of the external vibration on the cantilever beam vibration.

The one or more embodiments provide for another system. The system includes a tool configured for insertion into a wellbore. The system also includes a sensor housing connected to the tool and further including a channel. The system also includes a cantilever beam connected to the sensor housing and disposed within the channel. The system also includes an actuator connected to the cantilever beam and configured to cause the cantilever beam to vibrate. The system also includes a sensor connected to the cantilever beam and configured to generate a first signal representing a cantilever beam vibration of the cantilever beam. The system also includes an accelerometer connected to the sensor. The accelerometer is configured to generate a second signal representing an external vibration of the sensor housing. The external vibration changes the cantilever beam vibration. The system also includes a signal processor configured to receive, as input, the first signal and the second signal and to generate, as output, a filtered signal that reduces an effect of the external vibration on the cantilever beam vibration.

The one or more embodiments also provide for a method. The method includes vibrating a cantilever beam in a fluid disposed in a channel of a sensor housing. The sensor housing is subject to an external vibration. The method also includes generating a first vibration signal of the cantilever beam as the cantilever beam vibrates in the fluid. The first vibration signal is generated using a sensor connected to the sensor housing. The method also includes generating a second vibration signal of an accelerometer that is connected to one of the sensor and the sensor housing. The method also includes filtering the second vibration signal from the first vibration signal to generate a filtered output.

Other aspects will be apparent from the following description and the appended claims.

BRIEF DESCRIPTION OF DRAWINGS

Like elements in the various figures are denoted by like reference numerals for consistency.

DETAILED DESCRIPTION

In general, the one or more embodiments are directed to a combination of a device and a signal processing method. The combination of the device and the signal processing method enhance the accuracy of measuring one or more properties of a fluid. In turn, a more accurate measurement of the one or more properties of the fluid has useful applications. For example, the improved measurement may be used to determine how an ongoing drilling activity may be changed, or whether the ongoing drilling activity should continue. In another example, the improved measurement may permit a type of fluid encountered by a device that cannot be visualized (e.g., in a wellbore without a camera at the end of the drilling apparatus). In another example, the improved measurement may be used in scientific research regarding a variety of different fluids.

As indicated above, when measuring how a cantilever beam vibrates within a fluid, external vibrations may cause the cantilever beam to vibrate differently than expected. As a result, the external vibrations cause noise in the cantilever beam vibration signal. The noise may exceed the cantilever beam vibration signal, or otherwise make processing the cantilever beam vibration signal less accurate.

The one or more embodiments address this challenge by providing an accelerometer connected to the sensor that directly measures the vibrations of the external noise (e.g., flow noise, mud circulation noise, shocks, and vibration due to the tool movements in the wellbore). The accelerometer is not directly connected to the cantilever beam, though the sensor is directly connected to the cantilever beam. Thus, the accelerometer detects the vibrations experienced by the rest of the housing in which the sensor is located, and generates an accelerometer vibration signal. However, it is not straightforward to subtract the accelerometer vibration signal from the raw cantilever beam vibration signal, because the two signals are not necessarily correlated.

As a result, an improved signal processing method is provided using an adaptive filter. Both the raw cantilever beam vibration signal (which is influenced by the noise vibration) and the accelerometer vibration signal (which characterizes the noise vibration) are fed as an input to the adaptive filter. The output of the adaptive filter is a modified cantilever beam vibration signal. The modified cantilever beam vibration signal has had at least some of the noise vibration canceled out of the raw cantilever beam vibration signal. Thus, the modified cantilever beam vibration signal is closer to a true representation of the cantilever beam vibration signal alone, had the noise vibration not been present. The modified cantilever beam vibration signal then may be used to characterize the one or more properties of the fluid.

Figure 1:
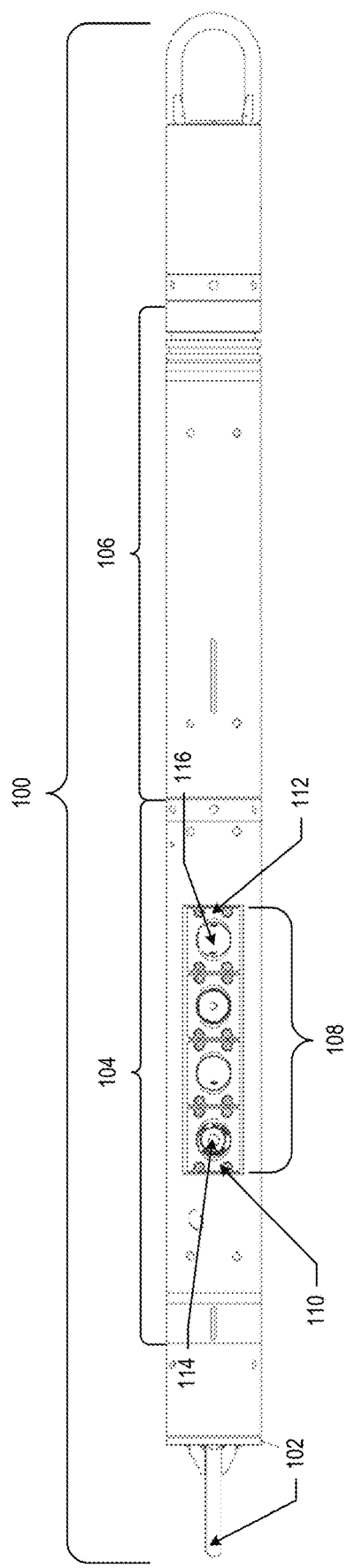
FIG. 1 shows a formation evaluation system for evaluating a wellbore, in accordance with one or more embodiments.
Figure 2:
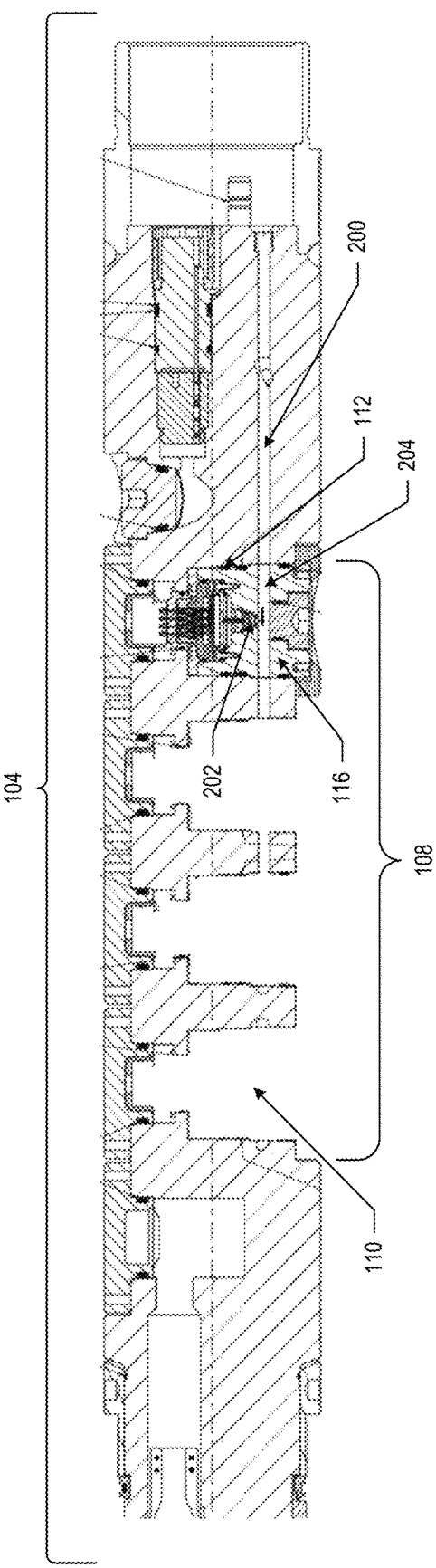
FIG. 2 shows a cross section of a close-up section of the formation evaluation system of FIG. 1.

FIG. 1 shows a tool for evaluating a wellbore, in accordance with one or more embodiments. FIG. 2 shows a cross section of a close-up section of the tool of FIG. 1. FIG. 1 and FIG. 2 refer to the same tool and thus share reference numerals referring to common objects with common descriptions. FIG. 1 and FIG. 2 should be considered together.

FIG. 1 shows a formation evaluation system (100) for evaluating various physical aspects a wellbore. The formation evaluation system (100) includes a tip (102), which is the leading edge of the formation evaluation system (100) when placed into a wellbore. The formation evaluation system (100) also includes one or more tools, which are segments of the formation evaluation system (100).

For example, the formation evaluation system (100) shown in FIG. 1 includes a probe module tool (104) and a hydraulic module tool (106). Many other tools may be present along a total length of the formation evaluation system (100), which may be longer and have more tools than what is shown in FIG. 1.

The probe module tool (104) includes a bay (108). The bay (108) includes slots in a side of the probe module tool (104), such as slot (110) and slot (112). Each slot may hold one of several different types of equipment. For example, the slot (110) may hold a probe that is configured to suck in fluid from the wellbore surrounding the formation evaluation system (100). In a specific example, when fluid in the wellbore is to be evaluated, a probe (114) in the slot (110) may be pushed against a wall of the wellbore, and then fluid against the wall sucked into the probe (114). In particular, the fluid is sucked into a channel (see channel (200) of FIG. 2) which can distribute the fluid to various equipment held in the slots.

Figure 3:
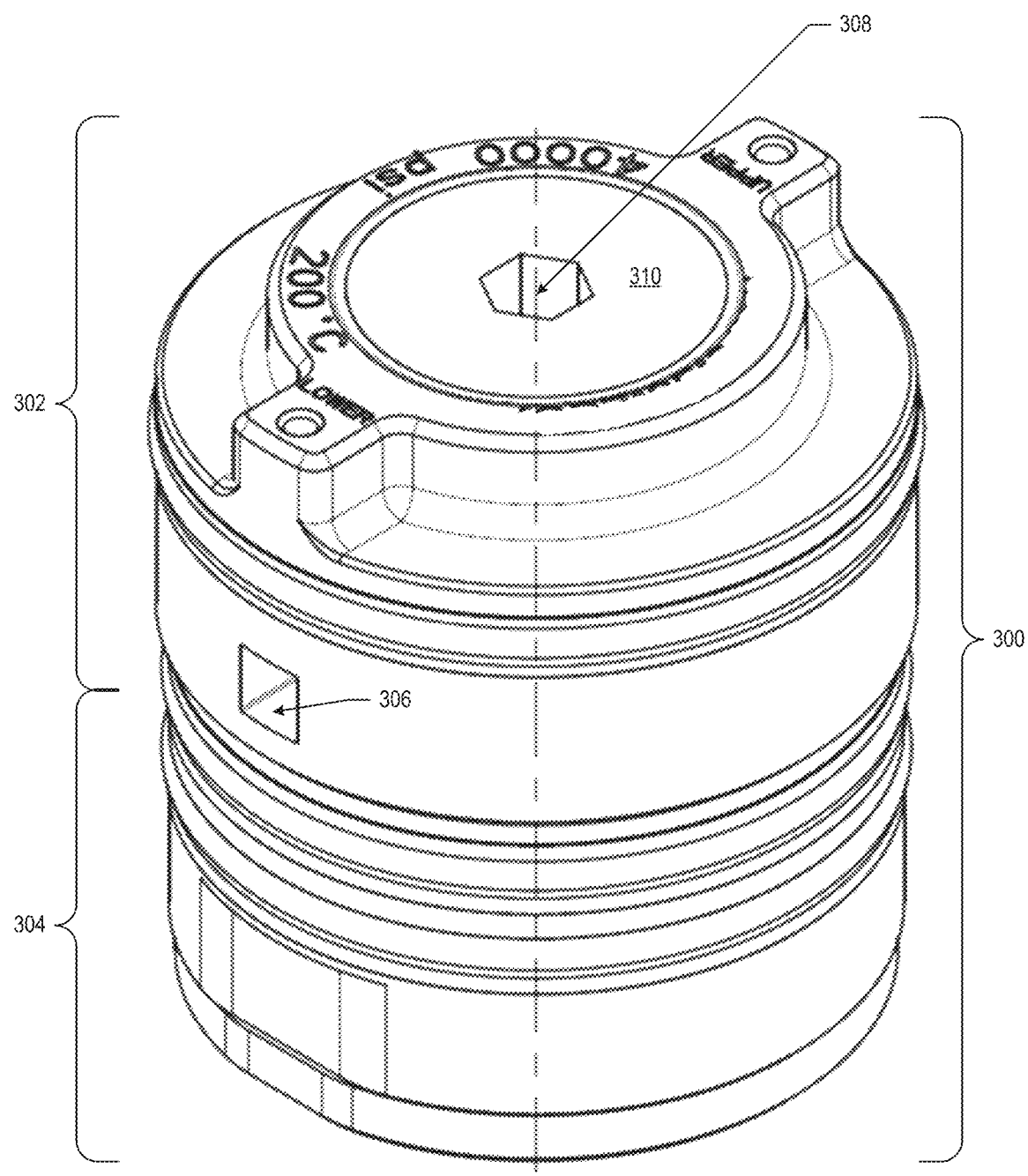
FIG. 3 shows a sensor housing, in accordance with one or more embodiments.
Figure 4:
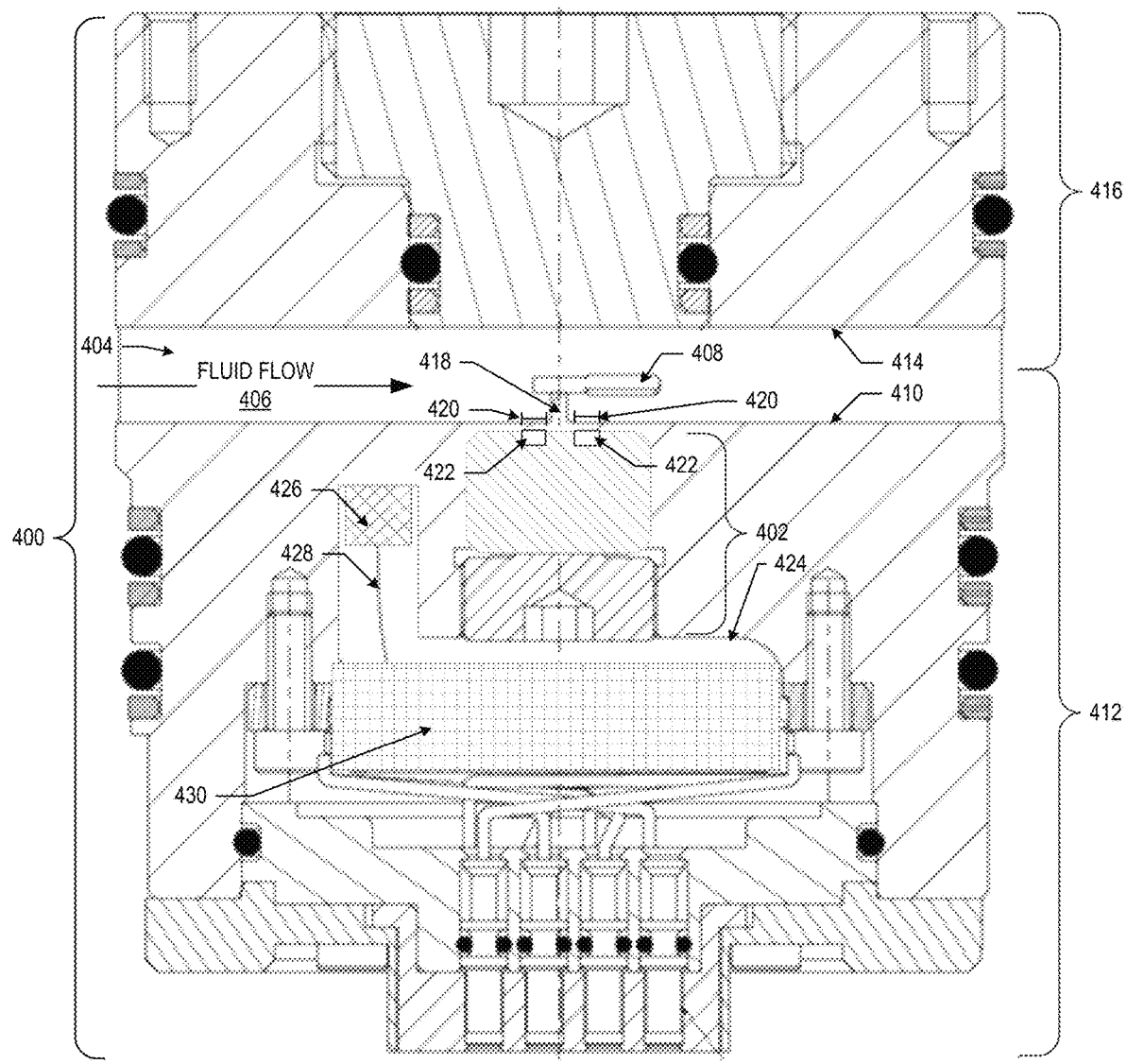
FIG. 4 shows a cross section of the sensor housing shown in FIG. 3, along with a sensor, in accordance with one or more embodiments.

The fluid then may be analyzed by the equipment in the slots. For example, slot (112) includes a sensor housing (116). The details of the sensor housing (116) are shown in FIG. 2 through FIG. 4.

Attention is now turned to FIG. 2. FIG. 2 shows a cross-section of the probe module tool (104) of the formation evaluation system (100) of FIG. 1.

The bay (108) of the probe module tool (104) is shown in cross-section in greater detail. For clarity, equipment in the slots (e.g., slot (110)) are omitted, though for context a cross-section of the sensor housing (116) is shown in slot (112). The sensor housing (116) includes a sensor (202). The sensor (202) is described in further detail with respect to FIG. 3 and FIG. 4.

A channel (200) is disposed through the probe module tool (104). The channel (200) may extend further into other tools (i.e., sections) of the formation evaluation system (100) shown in FIG. 1.

The channel (200) may be in fluid communication with channels, pipes, lines, or other fluid transfer mechanisms disposed in equipment placed in the slots. For example, the sensor housing (116) may have a sensor housing channel (204). In the example of FIG. 2, the sensor housing channel (204) is sized and dimensioned to match the size and dimensions of the channel (200) of the probe module tool (104).

In an embodiment, the sensor housing (116) forms a fluid tight seal with the walls of the slot (112). Thus, fluid sucked in through the probe (114) in the slot (110) moves through the channel (200) of the probe module tool (104) and through the sensor housing channel (204), without fluid directly touching some parts of the sensor (202). The arrangement of components of the sensor (202) and the sensor housing (116) are described in FIG. 3 and FIG. 4.

Attention is now turned to FIG. 3. The sensor housing (300) FIG. 3 shows a close-up view of the outside of the sensor housing (116) of FIG. 1 and FIG. 2. Thus, the sensor housing (300) is the sensor housing (116) of FIG. 2, as the sensor housing (116) of FIG. 2 may appear from one perspective when disposed outside of the slot (112) in the bay (108) of the probe module tool (104) shown in FIG. 1.

The sensor housing (300) includes an upper housing (302) and a lower housing (304). While the sensor housing (300) may be formed of an integral piece of material (e.g., stainless steel), the indicated portions of the upper housing (302) and lower housing (304) may be used for reference. In other embodiments, the upper housing (302) and the lower housing (304) may be formed as different parts that are connected together in a fixed or removably attached manner.

The upper housing (302) and the lower housing (304) intersect at a sensor housing channel (306). The sensor housing channel (306) may be the sensor housing channel (204) shown in FIG. 2. Thus, fluid pulled from the wellbore may flow through the sensor housing channel (306).

An axis (308) defines a longitudinal axis of the sensor housing (300). A first end (310) of the sensor housing (300) (relative to the axis (308)) may be inserted against a bottom of the slot (112) shown in FIG. 2.

Attention is now turned to FIG. 4, which shows a cross section of a sensor housing (400). The sensor housing (400) may be the sensor housing (300) of FIG. 3, or the sensor housing (116) of FIG. 1 and FIG. 2. Similarly, a sensor (402) in FIG. 4 may be the sensor (202) shown in FIG. 2.

A sensor housing channel (404) is disposed through the sensor housing (400). The sensor housing channel (404) may be the sensor housing channel (306) shown in FIG. 3 or the sensor housing channel (204) shown in FIG. 2.

A fluid flow (406) is shown by the arrow disposed along the length of the sensor housing channel (404). The fluid may have been pumped from a wellbore (or other environment) and into the sensor housing channel (404) using the probe (114), as described with respect to FIG. 1 and FIG. 2.

The fluid flow (406) passes over a cantilever beam (408). The cantilever beam (408) is a strip of metal or other material that has a known response to stimulation by an actuator. However, the cantilever beam (408) may have a variety of different shapes and is not limited to the strip shown in FIG. 4. For example, the cantilever beam (408) may be a circle, oblong, shaped like a spoon, etc.

The cantilever beam (408) is connected to a channel bottom (410). While the cantilever beam (408) is shown as located in the middle of the channel bottom (410) along the length of the channel bottom (410), the cantilever beam (408) may be located elsewhere along the length of the sensor housing channel (404). Similarly, while the cantilever beam (408) is shown connected to the channel bottom (410) (i.e., to the lower housing (412)), the cantilever beam (408) may be connected to the channel top (414) (i.e., to the upper housing (416)), or elsewhere on or around the housing, so long as the cantilever beam (408) will be disposed in the fluid to be tested.

The cantilever beam (408) may be connected to the channel bottom (410) via a stem (418). The stem (418) extends outwardly into the sensor housing channel (404) and thereby elevates the cantilever beam (408) relative to the channel bottom (410). The stem (418) may be part of the lower housing (412). Alternatively, the stem (418) may be part of the cantilever beam (408). Nevertheless, vibration in the cantilever beam (408) will cause vibration in the stem (418), and vice versa.

A membrane (420) may be disposed near or around the stem (418) (as indicated by the pair of brackets adjacent the stem (418)). The membrane (420) is a thin area of the lower housing (412) disposed around or near the stem (418). The term "thin" is relative to the thickness of the lower housing (412) along the channel bottom (410) outside the membrane (420). The thickness of the membrane (420) is as thin as possible to increase the vibration transfer from the actuator (described below) to the cantilever beam (408), but is thick enough to ensure the membrane (420) can withstand an anticipated downhole pressure. Because the stem (418) is connected to the cantilever beam (408), the membrane (420) is considered connected to the cantilever beam (408). However, the cantilever beam (408) may be directly connected to the membrane (420) in some embodiments.

The membrane (420) may enhance the vibrational response of the stem (418) and the cantilever beam (408), and provides a pressure wall which protects electronics from the downhole pressures. Specifically, the membrane (420) reduces the amount of mass at or near the cantilever beam (408) or the stem (418). For example, a cavity (422) may be present around the stem (418), underneath the membrane (420), as opposed to having a solid area of the sensor housing (400) surrounding the stem (418). The reduced mass decreases the vibration dampening effect of the mass of the lower housing (412) near the membrane (420).

The membrane (420) may have a variety of different shapes, and need not be a torus as shown in FIG. 4. Likewise, the membrane (420) may have different sizes and dimension from that shown or described, depending on a particular application, anticipated downhole pressures, etc.

The sensor housing (400) is further characterized by an equipment cavity (424) defined within the body of the sensor housing (400). The equipment cavity (424) may contain one or more sensors, actuators, and other electronics. For example, the equipment cavity (424) contains the sensor (402).

The sensor (402) may be, for example, a piezo-electric transducer capable of vibrating at a known rate of vibration. Thus, when the sensor (402) is commanded to vibrate, the resulting vibrations are transmitted to the stem (418) and thence into the cantilever beam (408). Accordingly, the actuation of the sensor (402) causes the cantilever beam (408) to vibrate at a known frequency.

It is contemplated that because the sensor (402) both senses vibrations (as described below) and also may be a piezoelectric actuator or other transducer, the sensor (402) may be considered both a transducer and a sensor (either passive or active). When the sensor (402) is activated (i.e. caused to vibrate), then the sensor (402) acts as a transducer. When the sensor (402) is not activated, then the sensor (402) may act as a passive sensor (i.e., receiving and measuring signals). However, the sensor (402) may also sense vibrations while activated, and thus may also be considered an active sensor (i.e., receiving and measuring signals while vibrating).

The sensor (402) senses the vibrations of many different sources. For example, the sensor (402) itself vibrates when the sensor housing (400) vibrates due to vibrations in the tool which holds the sensor housing (400). The sensor (402) also senses vibrations in the stem (418), and the cantilever beam (408). Because vibrations travel between the sensor (402), stem (418), and cantilever beam (408), the vibrations of these components are sensed by the sensor (402).

The sensor (402) is configured to generate a first signal that represents a cantilever beam vibration of the cantilever beam. For example, the frequency of vibration received at the sensor (402) via the stem (418) is assumed to be the same frequency of vibration of the cantilever beam (408). The sensor (402) measures the vibration frequency. The sensor (402) then generates a signal that encodes data that represents the vibration frequency. Over time, the changing vibration of the cantilever beam (408) may be characterized by causing the sensor (402) to continuously monitor the vibrations of the cantilever beam (408). As explained below, the characterized vibrations of the cantilever beam (408) may be used to characterize one or more properties of the fluid in the sensor housing channel (404).

The equipment cavity (424) also includes an accelerometer (426). The accelerometer (426) may be a tri-axial accelerometer that is connected to or embedded in the sensor housing (400). As shown in FIG. 4, the accelerometer (426) is disposed within the equipment cavity (424) of the lower housing (412). While a single axis or dual-axial accelerometer may be used, it is often useful to characterize external vibrations in three spatial dimensions.

The accelerometer (426) also may be connected to other portions of the sensor housing (400). The accelerometer (426) could be connected to some other part of the formation evaluation system or tool or drilling equipment, not including the sensor housing (400). However, it may be useful to directly connect the accelerometer (426) to the lower housing (412) in order to better correlate the vibration of the cantilever beam (408) to external vibrations. Furthermore, the vibrations of the cantilever beam (408) may be detected as being weaker at the accelerometer (426) than at the sensor (402), thereby providing an additional correlation between the cantilever beam vibrations and the external vibrations.

In any case, the accelerometer (426) is configured to generate a second signal representing an external vibration of the sensor housing (400). As the sub-components of the accelerometer (426) move, the accelerometer (426) generates data that represents the vibrations detected by the accelerometer (426). Because the accelerometer (426) is more indirectly connected to the cantilever beam (408) than the sensor (402), the external vibrations dominate the second signal.

Optionally, a wire (428) may be connected to the accelerometer (426). The wire (428) may carry the signals to and from the accelerometer (426), while concurrently providing power to the accelerometer (426). However, in other embodiments, the accelerometer (426) may operate using one or more batteries, and then use one or more wireless transmitters to transmit data to an electronic controller (430).

The electronic controller (430) is electrically connected to one or more of the sensor (402) and the accelerometer (426). The electronic controller (430) is a computer, a computer chip, an application specific integrated circuit (ASIC), or some other computational device. The electronic controller (430) may be connected to the sensor housing (400) within the equipment cavity (424). The electronic controller (430) may be disposed of outside of the sensor housing (400) in some embodiments or may be located remotely. For example, the electronic controller (430) instead may be a computer that receives wired or wireless signals from one or more of the sensor (402), and accelerometer (426), and the computer is located at a remote location relative to the location of the sensor housing (400).

In any case, the electronic controller (430) is configured to receive, as input, the first signal and the second signal. The electronic controller (430) is further configured to generate, as output, a filtered signal that reduces the effect of the external vibration on the cantilever beam vibration. The process of generating the filtered signal is described with respect to FIG. 5 through FIG. 14.

Figure 7:
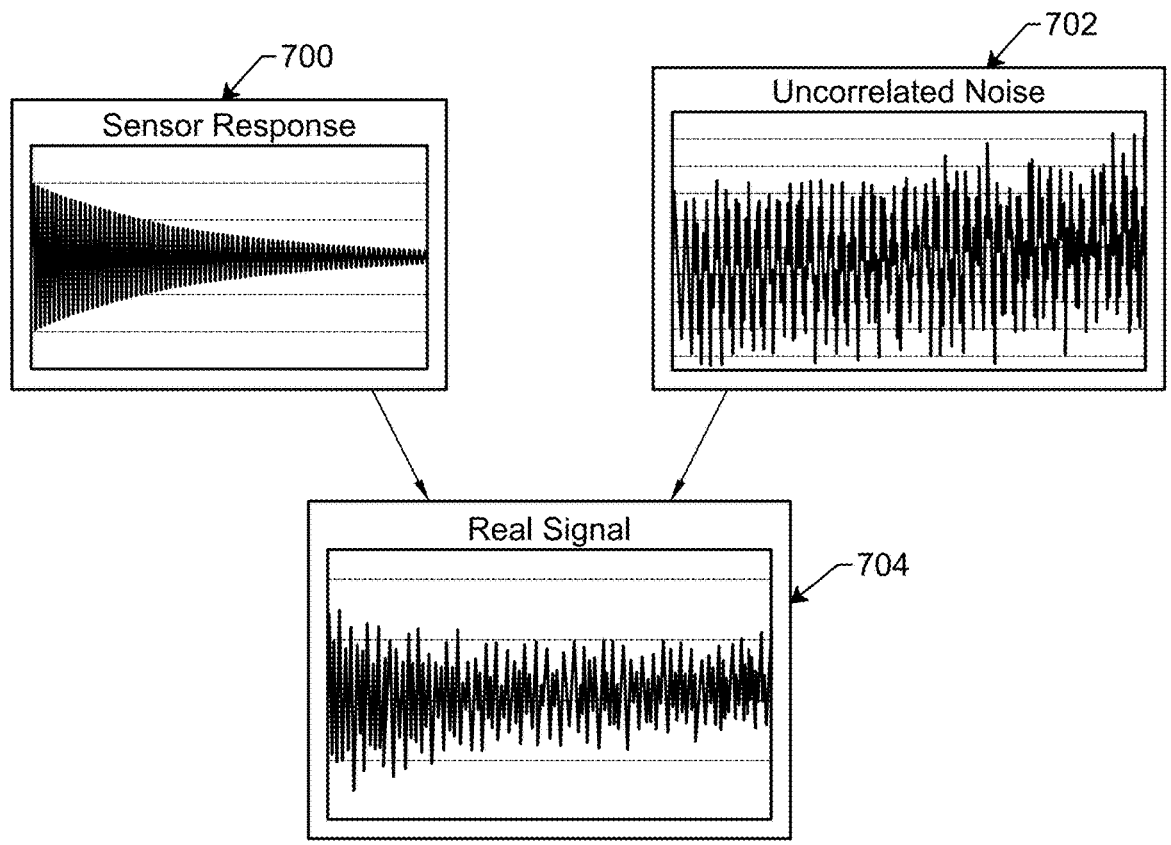
FIG. 7 is an example of how noise affects the measured sensor signal, in accordance with one or more embodiments.

The electronic controller (430) may include an adaptive filter that is configured to perform the noise cancellation step described in FIG. 7, for example. The adaptive filter is described with respect to FIG. 8 and FIG. 9. The adaptive filter may be configured to generate a measurement of the external vibration and correlate the external vibration to the cantilever beam vibration to generate a correlated vibration signal. The adaptive filter may be a Wiener filter, for example.

The electronic controller (430) also may include a signal adder. The signal adder is configured to subtract the correlated vibration signal from the cantilever beam vibration, as described with respect to FIG. 6 through FIG. 9.

The electronic controller (430) also may include a flow analyzer. The flow analyzer is configured to take, as input, the filtered signal and to characterize, as output, a physical property of a fluid flowing through the channel (e.g., a viscosity of the fluid). The process of characterizing the physical property is described with respect to FIG. 5 and FIG. 6.

In use, the sensor housing (400) is disposed within the bay of a probe module tool. When the probe module tool is placed at a desired location within the wellbore, fluid from the wellbore is sucked into the probe module tool and eventually forced into the sensor housing channel (404). The sensor (402) is then actuated, causing the stem (418) and the cantilever beam (408) to vibrate. The sensor (402) then stops vibrating. After a pre-determined delay period, the ongoing vibrations of the cantilever beam (408) are measured passively by the sensor (402) as the vibrations travel from the cantilever beam (408), through the stem (418), and into the sensor (402). The vibrations of the cantilever beam (408) form a first signal. Concurrently, the accelerometer (426) measures vibrations experienced by the sensor housing (400), and in particular by the lower housing (412). The vibrations of the accelerometer (426) form a second signal. The first signal and the second signal are filtered, as described below. The filtered signal is then used to characterize a property of the fluid in the sensor housing channel (404).

Figure 5:
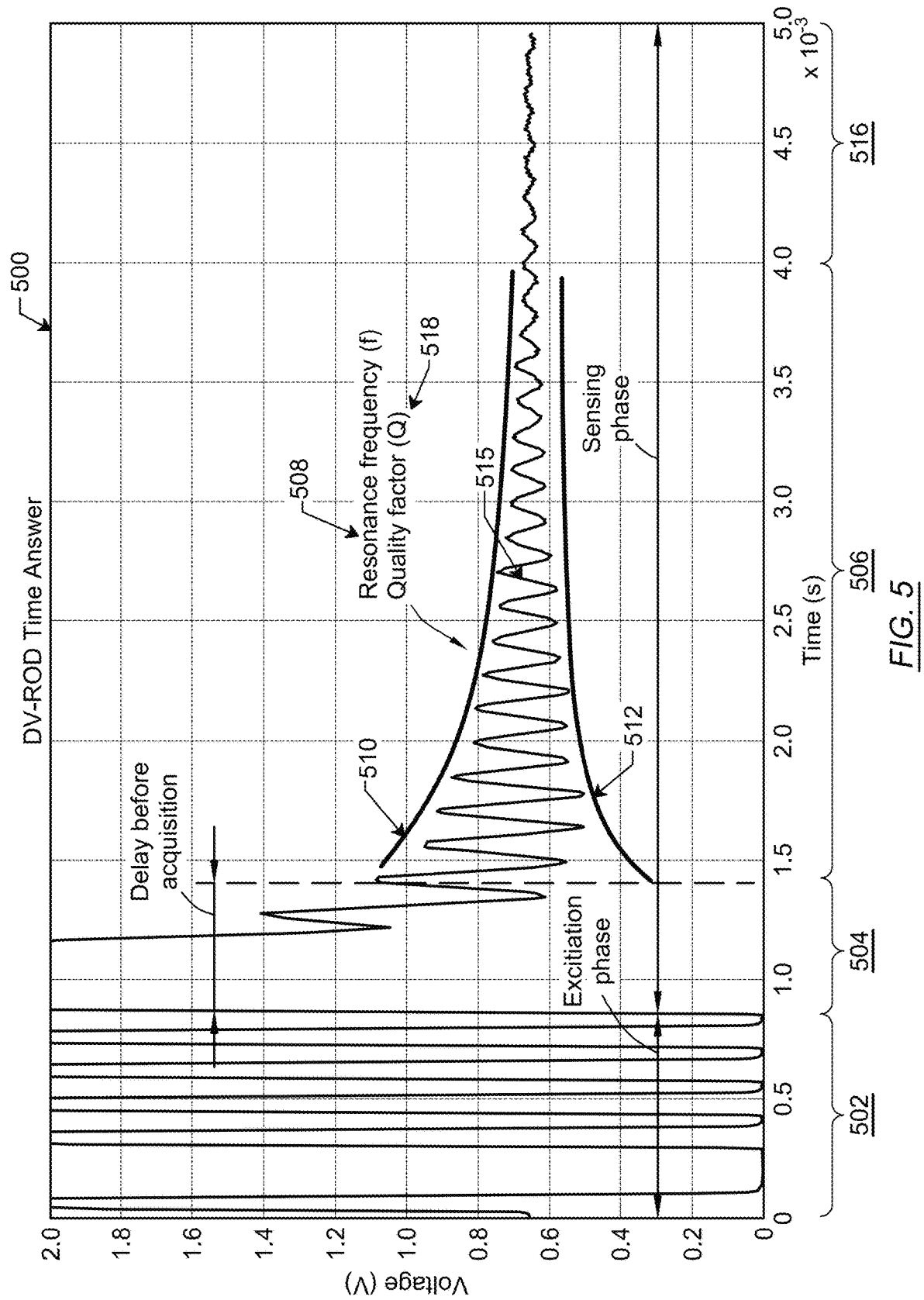
FIG. 5 is a graph of a measurement of cantilever beam vibration over time, in accordance with one or more embodiments.

FIG. 5 is a graph of a measurement of cantilever beam vibration over time, in accordance with one or more embodiments. The graph (500) shown in FIG. 5 may be generated from data received from the sensor as the sensor measures vibrations in the cantilever beam shown in FIG. 4.

Initially, the actuator excites the cantilever beam during an excitation phase (502). In particular, the actuator rapidly sends a series of impulses to the cantilever beam, causing the cantilever beam to vibrate at a pre-determined frequency.

Next, during a delay phase (504), the actuator stops exciting the cantilever beam. The frequency of cantilever beam vibration rapidly decays during the delay phase (504). Eventually, the frequency of cantilever beam vibration reaches a resonance frequency.

A resonant frequency is a frequency at which the response amplitude of a wave (including a vibrating object) is at a relative maximum. Small periodic forces that are near a resonant frequency of the system may produce large amplitude oscillations in the system due to the storage of vibrational energy. Resonance occurs when a system (e.g., the actuator, stem, and cantilever beam) is able to store and easily transfer energy between two or more different storage modes (such as the kinetic energy of the moving cantilever beam and electrical energy of the actuator).

However, there are some energy losses from cycle to cycle of the vibration. The energy losses are called damping. When damping is small, the resonant frequency is approximately equal to the natural frequency of the system.

The natural frequency of the system is a frequency of unforced vibrations. In other words, the natural frequency is the frequency at which a system tends to oscillate in the absence of any driving or damping force. If the oscillating system is driven by an external force (i.e., the actuator) at the frequency at which the amplitude of the motion of the cantilever beam is at its greatest (close to a natural frequency of the system), then the natural frequency is also the resonant frequency.

Returning to FIG. 5, the graph (500) shows a sensing phase (506). During the sensing phase (506), the sensor measures the frequency at which the cantilever beam vibrates while the cantilever beam is disposed within the liquid in the channel bottom. The sensing phase (506) is performed once the cantilever beam reaches a resonance frequency (508), indicated by the letter "f." As can be seen, by the top narrowing line (510) and bottom narrowing line (512), damping decreases the amplitude of the resonance frequency (i.e., how much the cantilever beam moves back in forth within the channel). The wave (515) within the top narrowing line (510) and the bottom narrowing line (512) shows the movement of the cantilever beam in two dimensions (e.g., up and down or side-to-side within the cantilever beam). Damping also lengthens the frequency at which the cantilever beam vibrates over time.

Eventually, during a decay phase (516), the cantilever beam stops vibrating near the resonance frequency (508). As a result, the cantilever beam vibrations decay relatively quickly (compared to the sensing phase (506)) in both amplitude and frequency until the cantilever beam substantially stops vibrating.

The vibration data of the cantilever beam is taken during the sensing phase (506) while the cantilever beam is vibrating at or near the resonance frequency (508). The term "near" means a frequency that is not at the peak resonance frequency (508) but is within a pre-determined frequency range about the resonance frequency (508).

The data taken during the sensing phase (506) may be used to generate a quality factor (518), represented by the letter "Q". The quality factor (518) is related to the logarithmic decrement controlling the damping motion of the cantilever beam, as described further below with respect to FIG. 5. The quality factor (518) depends on the physical properties of the liquid in which the cantilever beam vibrates. Thus, the quality factor (518), which may be determined during the sensing phase (506), may be used to determine the physical properties of the liquid.

Figure 6:
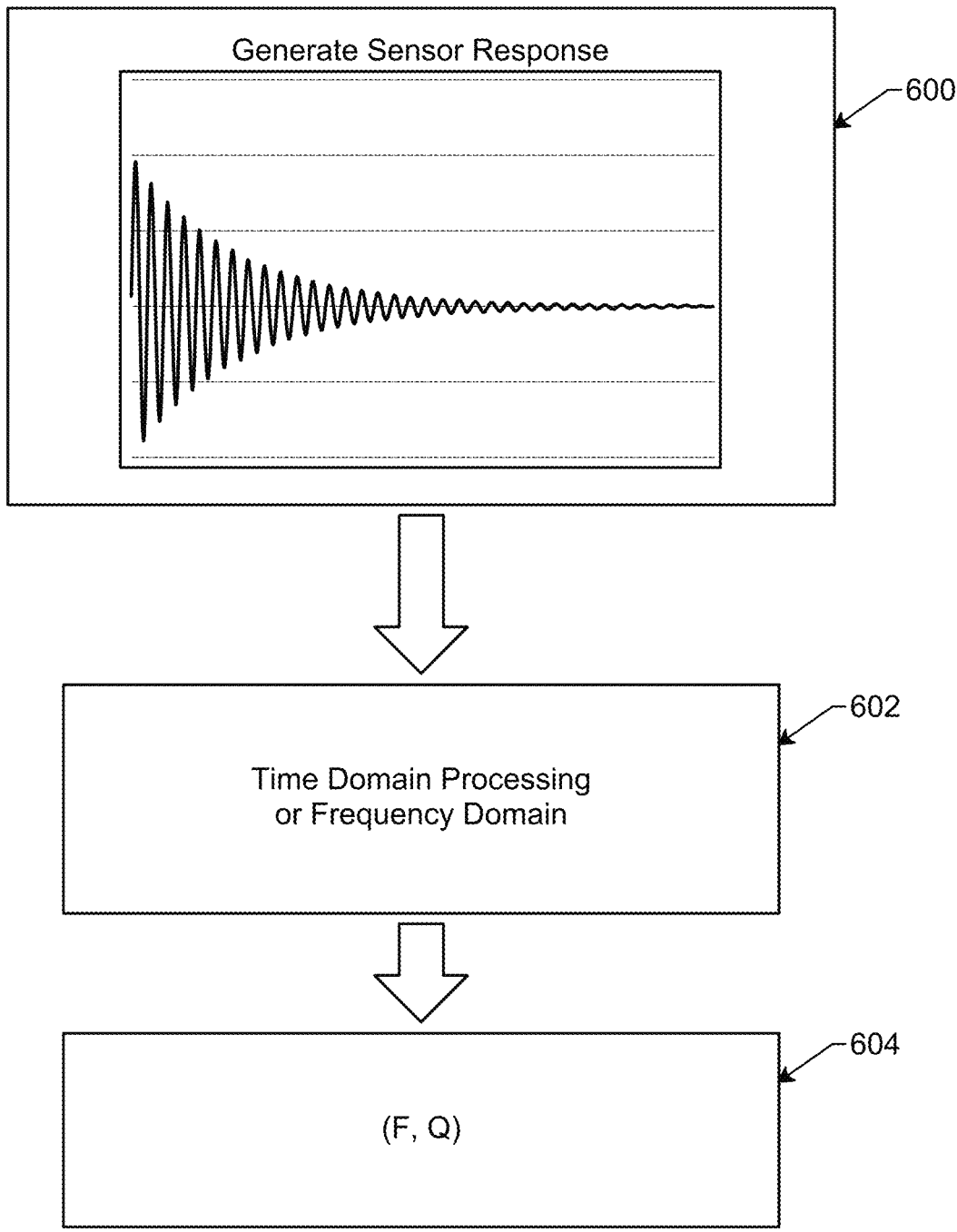
FIG. 6 is an example of a method for processing the data shown in FIG. 5, in accordance with one or more embodiments.

FIG. 6 is an example of a method for processing the data shown in FIG. 4, in accordance with one or more embodiments. The method of FIG. 6 may be performed using the devices shown in FIG. 1 through FIG. 4 and the data acquisition procedure described with respect to FIG. 5, in conjunction with a signal processor. The signal processor may be the signal processor described with respect to FIG. 4, or maybe an external computer.

The method (600) begins with step (602), which includes generating a sensor response. Generating the sensor response may be performed by generating and storing quantitative data according to the data acquisition procedure during a sensing phase (506) of the vibration of the cantilever beam, as described with respect to FIG. 5.

Step 604 includes time domain processing or frequency domain processing of the sensor response acquired at step 600. A vibration system may be described mathematically in a time domain or in a frequency domain. It is possible, mathematically, to switch back and forth between the time domain and the frequency domain. The selection of the time domain and the frequency domain is made by a computer programmer or a scientist responsible for performing the experiment in question, based on considerations such as ease of calculations to determine a particular physical property of interest. The processing of the sensor response (either in the time domain or the frequency domain) is described further below.

The output of processing of the sensor response is the frequency, "f," and the quality factor, "Q," of the measured cantilever beam vibrations. As mentioned above, and as elaborated below, the f and the Q may be used to quantitatively characterize one or more physical properties of the fluid in which the cantilever beam vibrates.

Step 604 includes storing the values of f and Q. The values of f and Q may be stored for a variety of time segments within the sensing phase (506) shown in FIG. 6, as the values of f and Q may vary over time.

Attention is returned to step 604, which is time domain processing or frequency domain processing of the sensor response. The details of the processing are now presented.

As indicated above, the sensor measures the mechanical resonance of a cantilever beam vibrating in fluid. The cantilever beam is excited by a piezoelectric transducer for a short delay time, then the cantilever beam continues to freely vibrate in the fluid, producing the voltage corresponding to the resonant response of the cantilever beam using the same piezoelectric transducer. The voltage response v(t) conforms to a damped harmonic model, which may be described mathematically as:

$$v(t) = A e^{-2\pi f \alpha \cdot t} \sin(2\pi f \cdot t + \phi) \quad \text{(Equation 1)}$$

In Equation 1, "A" is the amplitude of the initial transient, "α" is the logarithmic decrement controlling the damping of the motion, "f" is the resonance frequency of cantilever beam (in Hertz), "t" is the time index and "φ" is the unknown phase angle.

Multiple resonant modes exist for the cantilever beam. The sensor is mechanically designed to provide two modes. In Equation (1), the logarithmic decrement "α" is related to the quality factor (i.e., Q) by the following equation:

$$\alpha = \frac{1}{2Q} \text{ and } f' = \frac{f}{\sqrt{1 - \frac{1}{4 \cdot Q^2}}} \quad \text{(Equation 2)}$$

Thus, the first processing is to determine the resonance frequency "f" and quality factor "Q" from the acquired voltage response. Using the determined resonance frequency "f" and quality factor "Q," one can then determine the density and viscosity of fluid surrounding the cantilever beam, based on the following working equations:

The working equations are based on the Bernoulli theory. The Bernoulli theory provides dynamic beam equation from derivation of Euler-Lagrange equation. The equation depends on the boundary conditions, the beam geometry, the beam material and the load. The equation per unit length of a beam clamped at x=0 is given below $$\rho_B b h \phi_1(x) \frac{\partial^2 \alpha(t)}{\partial t^2} + g_0 \phi_1(x) \frac{\partial \alpha(t)}{\partial t} + E I k_1^4 \phi_1(x) \alpha(t) = F_{exc}(x) e^{j\omega t} + F_{fs}(x, t)$$

Where:
$\rho_B$: beam density
b: beam width
h: beam height
$v(x, t) = \phi_1(x)\alpha(t)$ deflexion along z
$\phi_1(x)$: first bending mode shape function
$g_0$: inherent damping coefficient
E: beam young's modulus
I: beam second moment of area
$k_1^4$: parameter depending on the beam length
$F_{exc}(x)e^{j\omega t}$: excitation force per unit of length
$F_{fs}(x,t)$: fluid force per unit of length
The working equations then can be expressed as:

$$\rho \frac{d\vec{v}}{dt} = -\overrightarrow{\text{grad}}P + \eta \Delta \vec{v} + \left(\xi + \frac{\eta}{3}\right)\overrightarrow{\text{grad}}(div\vec{v})$$

where ρ corresponds to the fluid density and $\overrightarrow{\text{grad}P}$ represents the force coming from the pressure P, $\vec{v}$ corresponds to the vibrating speed of the beam, η is the fluid viscosity and ξ is the second fluid viscosity.

The quality factor is given by:

$$Q = (\rho_{beam} + \rho_{fluid}) \frac{R \delta \omega}{4\eta}$$

with $\rho_{fluid}$ corresponding to the fluid density. The fluid viscosity is given by:

$$\eta = \frac{(\rho_{beam} + \rho_{fluid})^2 \omega_0 R^2}{8\rho_{fluid}} \left( \frac{1}{Q} - \frac{\rho_{beam}}{(\rho_{beam} + \rho_{fluid})} \frac{1}{\omega_0} \frac{\omega_{vac}}{Q_{vac}} \right)^2$$

where $\omega_0$ is linked to beam resonance frequency into the fluid, and $\omega_{vac}$ is linked to beam resonance frequency into the vacuum and $Q_{vac}$ represents loss in the vacuum.

from the signal generated from vibration of the cantilever beam (408). The modified sensor response may then be used according to the time domain or frequency domain processing to produce a more accurate determination of the values of the frequency, "f" and the quality factor, "Q."

The values of "f" and "Q" may then be used to determine one or more physical properties of the fluid being tested. For example, the viscosity of the fluid may be determined using the working equations given above. Other techniques may also be used to determine the density and viscosity of the fluid. For example:

---

Density

Calculation $$\rho_F = \frac{4m}{\pi b^2} \left[ K \left( \frac{\omega_0}{\omega} \right)^2 - 1 \right] (Fit_{10} + Fit_{11} X_K)$$

Viscosity

Transversal bending mode of the cantilever beam

Calculation $$\eta = \frac{2mK\omega_0^2 \left[ \frac{1}{Q} - \frac{\omega}{\sqrt{K} Q_0 \omega_0} \right]^2}{\pi\omega \left[ 1 - \frac{1}{K} \left( \frac{\omega}{\omega_0} \right)^2 \right]} (Fit_{12} + Fit_{13} X_K + Fit_{14} X_K^2 + Fit_{15} X_K^3)$$

Lateral bending mode of the cantilever beam

Calculation $$\eta = \frac{2mK\omega_0^2 \left[ \frac{1}{Q} - \frac{\omega}{\sqrt{K} Q_0 \omega_0} \right]^2}{\pi\omega \left[ 1 - \frac{1}{K} \left( \frac{\omega}{\omega_0} \right)^2 \right]} (Fit_{22} + Fit_{23} X_K + Fit_{24} X_K^2 + Fit_{25} X_K^3)$$

---

Assuming the model defined by (Equation 1), a variety of selection parameters may be used to determine whether a time domain or a frequency domain method should be used to extract the "f" and "Q". When the values of f and Q require low computational and memory capabilities, or have a low output rate requirement, then a time domain can be used. Otherwise, a frequency domain may be suitable.

There is, however, a drawback associated with both the time domain method and the frequency domain method. Both methods rely on the fact that the vibration of the cantilever beam is only the result of the excitation and the interaction between the fluid and the cantilever beam. As indicated above, external vibrations of the sensor will act as noise that degrades the accuracy of the determination of the "f" and the "Q."

In wireline, or drilling and measurement conditions (such as during oil and gas production), the vibrations noise profiles are quite different. Sources of external vibrational noise that may include stick and slip of the drilling tool, motor noise propagating to the different chassis, pump vibrations, and possibly other vibrations may propagate to both the cantilever beam and the sensor.

As mentioned above, both the time domain method and the frequency domain method assume that the cantilever beam vibration response is only dependent on the fluid under measurement. But if external vibrations influence the sensor, the working equations will not have an accurate input, and as such errors will arise in the determination of "f" and "Q."

The one or more embodiments also address the problem of external noise by introducing an adaptive filter that may be used to cancel at least some of the external vibrations In the above equations, the terms are defined according to the working equation, above, including the values of "f" and "Q."

FIG. 7 is an example of how noise affects the measured sensor signal, in accordance with one or more embodiments. While the principles of the effect of external vibrations on the measured signal are already described with respect to FIG. 6, FIG. 7 presents a pictorial representation of the principle for clarity of understanding.

In FIG. 7, the sensor response (700) is the "true" resonance response of the cantilever beam during the sensing phase (506) while the cantilever beam vibrates in the fluid. The term "true" means that the vibration data that is shown in the sensor response (700) is what would have been measured, had there been no external vibrations operating on the cantilever beam or the sensor.

The uncorrelated noise (702) is a representation of the combined frequencies of all external vibrations. As can be seen, both the frequency and amplitude of the external vibrations may vary considerably over time and may appear to be random to an untrained viewer. The external vibrations of the uncorrelated noise (702) are undesirable because the external vibrations interfere with the accurate determination of the frequency and quality factor, described above. Thus, the data shown in the uncorrelated noise (702) is termed "noise." The term "uncorrelated" is used, because the uncorrelated noise (702) does not include the "true" vibrations of the cantilever beam (408) as shown in the sensor response (700), and there is no correlation in time between the two sets of measurements.

It is assumed in the one or more embodiments that the sensor response (700) cannot be measured directly while external vibrations are present, because the sensor and the cantilever beam are also vibrated by the external vibrations. It is further assumed that the uncorrelated noise (702) cannot be measured directly while the cantilever beam is vibrated because the cantilever beam vibrations caused by the actuator would change the measurement of the uncorrelated noise (702). Furthermore, it is assumed that the uncorrelated noise (702) cannot be measured before or after the sensing phase (506), and then subtracted directly from the signal measured during the sensing phase (506), because the uncorrelated noise (702) is too variable over time.

Thus, what is measured by the sensor is the real signal (704). The real signal (704), as can be seen in FIG. 7, is a combination of the sensor response (700) and the uncorrelated noise (702). The amplitudes and frequencies of the different waves add together in the real signal (704). Because the uncorrelated noise (702) and the sensor response (700) cannot be measured directly in a real environment, removing the uncorrelated noise (702) from the real signal (704) is difficult.

Figure 8:
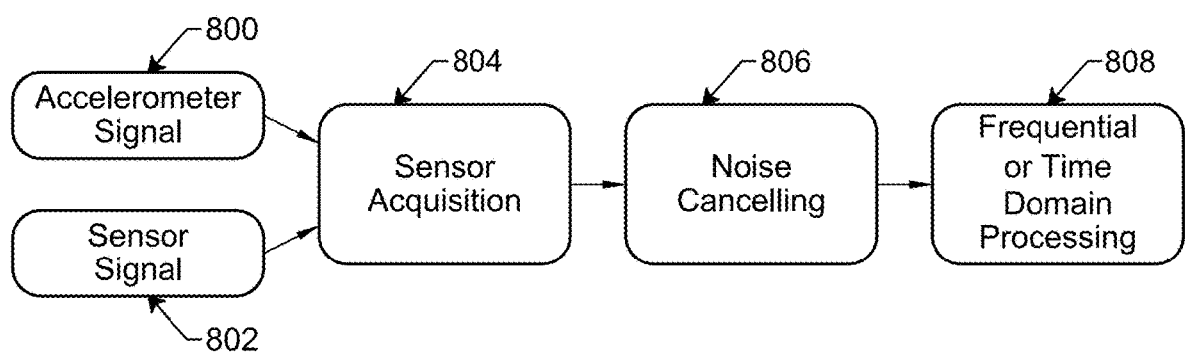
FIG. 8 shows a process for cancelling noise from a measured sensor signal, in accordance with one or more embodiments.

FIG. 8 shows a process for canceling noise from a measured sensor signal, in accordance with one or more embodiments. Thus, for example, the method of FIG. 8 may be used to mitigate the effect of the uncorrelated noise (702) from the real signal (704) described with respect to FIG. 7. The method of FIG. 8 uses an accelerometer signal from the accelerometer of FIG. 4 that measures the overall vibration of the sensor of FIG. 4. Because the accelerometer is indirectly, or not connected, to the cantilever beam, the accelerometer signal may be used, in conjunction with a filter described with respect to FIG. 9 and FIG. 10, to mitigate the effect of the uncorrelated noise (702) on the real signal (704) of FIG. 7.

At step 800 an accelerometer signal is generated. The accelerometer signal may be generated by the accelerometer measuring vibrations over time. The accelerometer generates the accelerometer signal via a time-varying series of electrical voltages, where the amount of electrical voltage represents the degree of movement experienced by the accelerometer. The electrical voltages may be transmitted via wired or wireless communications, as described below. The accelerometer signal will be closer to the uncorrelated noise (702) of FIG. 7 than to the real signal (704) of FIG. 7. However, because the accelerometer signal may be influenced by the sensor response (700) of FIG. 7, the accelerometer signal may not be the uncorrelated noise (702), but rather a variation of the real signal (704) shown in FIG. 7.

Step 802 includes generating a sensor signal. The sensor signal may be generated as described above with respect to FIG. 4, using a procedure similar to that described with respect to generating the accelerometer signal. However, the sensor signal is generated by the sensor. The sensor signal may be the real signal (704) of FIG. 7, for example.

Step 804 includes sensor acquisition. In particular, the accelerometer signal and the sensor signal are stored and prepared for further processing.

Figure 13:
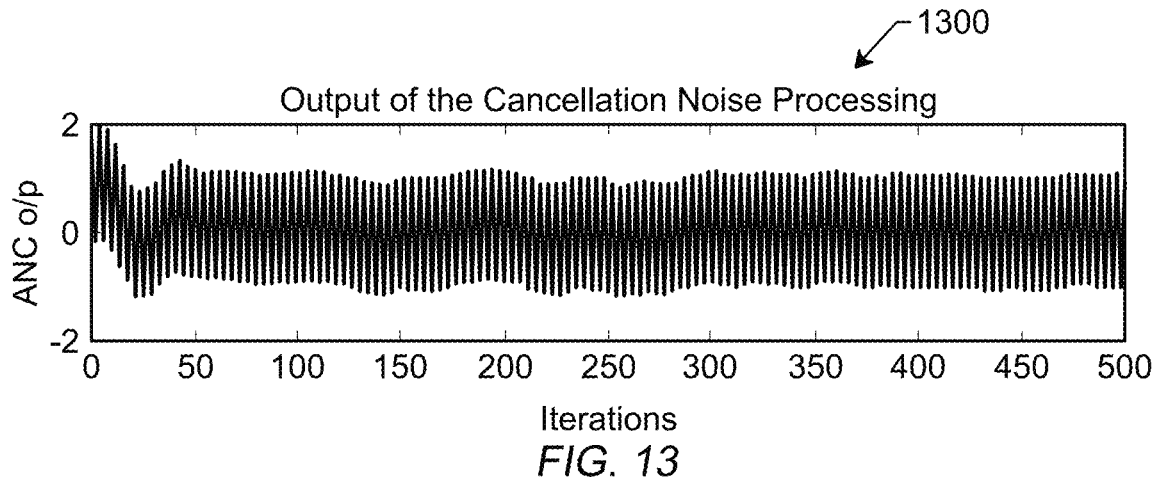

Step 806 includes performing noise cancellation using an adaptive filter. The adaptive filter takes, as input, the accelerometer signal and the sensor signal. The adaptive filter produces, as output, a filtered signal. The details of the operation of the adaptive filter are described with respect to FIG. 9 and FIG. 10. An example of the filtered signal is shown in FIG. 13.

Step 808 includes performing frequency domain or time domain processing, as determined by the responsible scientist. The input to the frequency domain or time domain processing is the filtered signal. The output of the frequency domain or time domain processing is the determined values of "f" and "Q." The generation and use of "f" and "Q" are described above with respect to FIG. 6. In one embodiment, the method of FIG. 8 may terminate thereafter.

The method of FIG. 8 may be varied. For example, steps 808 may include the full processing, which also includes a digital filtering operation (e.g., a low pass filter, for instance). Considering the noise canceling step 806, a data preprocessing step could be implemented since the low pass filtering can be displaced from step 808 to a preprocessing step. Additional filtering (e.g., pre-processing) can also be used, depending on the specific tool string knowledge.

Figure 9:
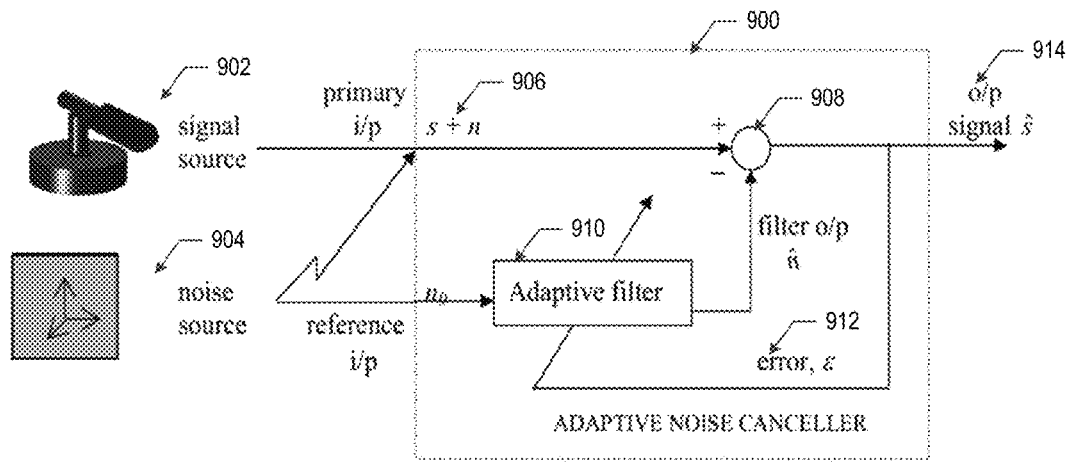
FIG. 9 shows noise cancellation system, in accordance with one or more embodiments.

FIG. 9 shows a noise cancellation system, in accordance with one or more embodiments. The noise cancellation system (900) shown in FIG. 9 may be used to perform step 806 of FIG. 8 or to perform the adaptive filtering mentioned above.

The noise cancellation system (900) is software or application specific hardware that processes the sensor signal (902) and the accelerometer signal (904). The implementation of the software or application specific hardware operates as described below.

The sensor signal (902) may be designated as the primary input ("primary i/p" as shown in FIG. 9). The sensor signal (902) is the true sensor signal that is desired. The accelerometer signal (904) may be designated as the reference input ("reference i/p" as shown in FIG. 9). The accelerometer signal (904) is the noise signal. However, because the sensor signal (902) is influenced by the noise, the primary input becomes the signal plus noise (906) (i.e., the signal plus noise (906) is the sensor signal (902) plus the accelerometer signal (904)). The signal plus noise (906) is provided to a signal adder (908).

Concurrently, the reference input (i.e., the accelerometer signal (904)) serves as input to an adaptive filter (910). The details of the adaptive filter (910) are described with respect to FIG. 10. The output of the adaptive filter (910) is an estimation of the error (912), ε, in the primary input (i.e., the sensor signal (902)). The adaptive filter (910) not only identifies the noise but correlates, with respect to time, the noise to the primary input (i.e., the sensor signal (902)). Thus, the error (912) may be subtracted directly from the signal plus noise (906).

Accordingly, the error (912) is provided to the signal adder (908). The signal adder (908) subtracts the error (912), ε, from the signal plus noise (906). The resultant output signal (914) is an estimation of the true signal (i.e., the sensor signal (902)). The output signal (914) may then be used to estimate "f" and "Q" (the frequency and the quality factor respectively), as described above.

Figure 10:
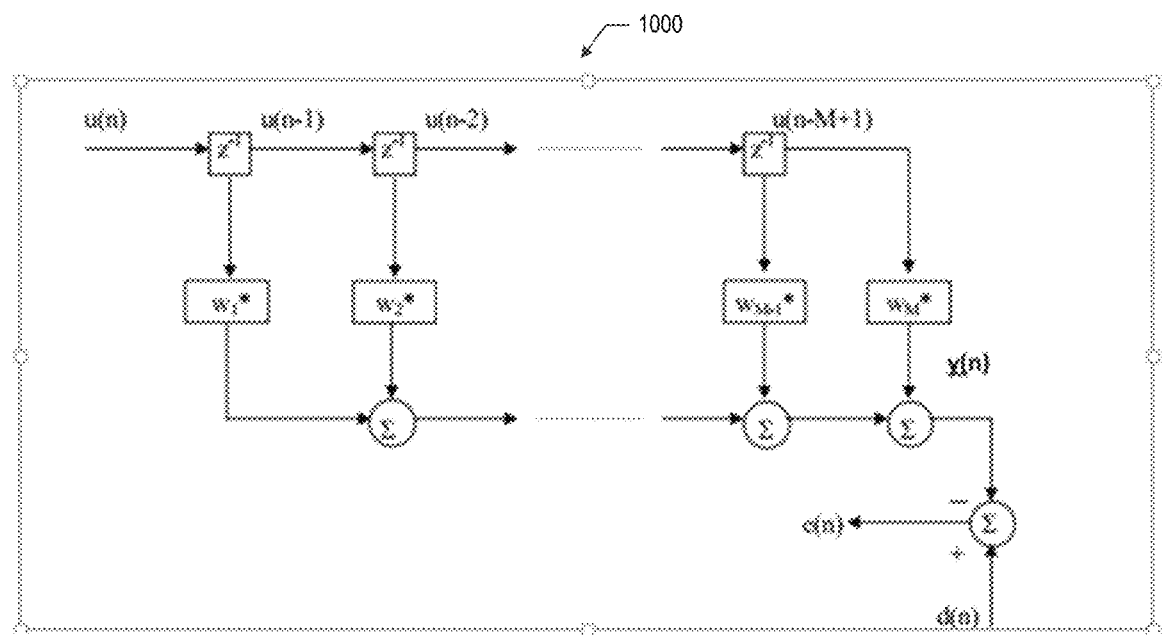
FIG. 10 shows an adaptive noise canceler for the noise cancellation system of FIG. 9, in accordance with one or more embodiments.

FIG. 10 shows an adaptive noise canceler for the noise cancellation system of FIG. 9, in accordance with one or more embodiments. The adaptive filter (1000) shown in FIG. 10 is an example of the adaptive filter (910) shown in FIG. 9. The adaptive filter (1000) shown in FIG. 10 is an example of a Wiener filter.

The input sample number n, is referred as u(n). The signal output at time n, is referred as d(n) and stands for the estimation of the desired response to be measured. With the usage of linear filter, the output of the can be described as:

$$y(n) = \Sigma_{k=0}^{k=M} w_k u(n_k) = w^T \cdot u(n) = u^T(n) \cdot h \quad \text{(Equation A)}$$

Where $w^T = [w_1, w_2, w_3, \ldots, w_M], u^T(n) =$
$[u_n, u_{n-1}, \ldots, u_{n-M+1}]$ \quad (Equation B)

The one or more embodiments use the estimation between the estimate output and the input signal. The estimated error is e(n)=d(n)−y(n).

In a Wiener filter, such as the particular configuration shown in FIG. 10, the minimum mean-squared error criterion is reached using the mean-square error.

$$J(w)=E[e(n).e(n)]=\sigma_d^2-2p^Tw+w^TRw \quad \text{(Equation C)}$$

Where:

$$\sigma_d^2=E[d^2(n)] \quad \text{(Equation D)}$$

$$p=E[u(n)d(n)] \quad \text{(Equation E)}$$

$$R=E[u(n).u^T(n)] \quad \text{(Equation F)}$$

The minimization of the second order function (i.e., Equation C) of the tap-weight vector w, J(w) is obtained when the gradient vector is null. The minimization of the second order function may be expressed as:

$$\frac{\partial J(w)}{\partial w}=0 \quad \text{(Equation G)}$$

Based on (Equation A), the value w opt that provides this null gradient is as follows:

$$R.w_{opt}=p \quad \text{(Equation H)}$$

Thus, the output of the adaptive filter (1000), $w_{opt}$, may be expressed as:

$$w_{opt}=R^{-1}P \quad \text{(Equation I)}$$

Where "R" is the autocorrelation matrix of the input signal, "$R^{-1}$" is the inverse of the autocorrelation matrix, and "p" is the cross correlation between the desired output and the input. In other words, the adaptative filter (1000) is set based on the computation of the auto-correlation matrix and the cross-correlation matrix.

The adaptive filter (1000) shown in FIG. 10 may be the adaptive filter (910) shown in FIG. 9. Thus, the value of $w_{opt}$ from (Equation I) of FIG. 10 is the error (912), ε, that is provided as input to the signal adder (908), as described with respect to FIG. 9.

Figure 11:
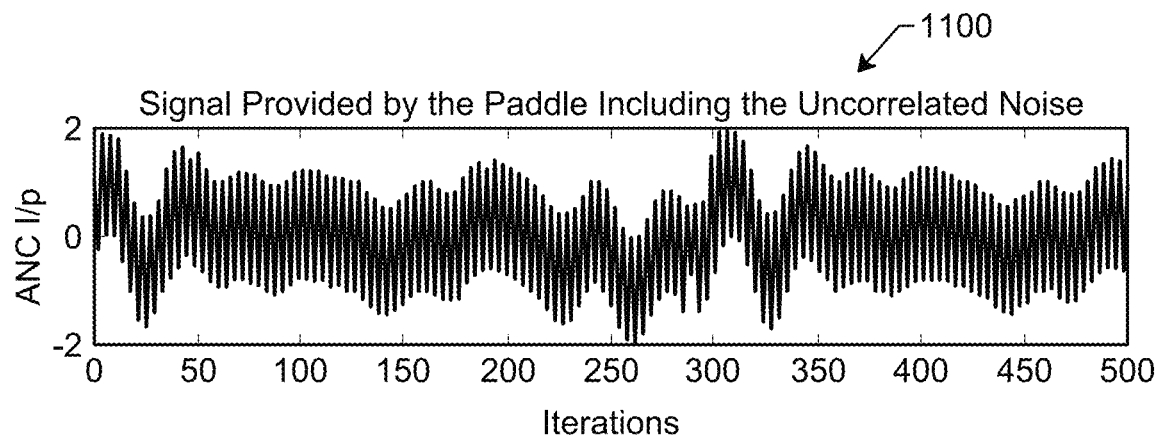
FIG. 11, FIG. 12, and FIG. 13 show different vibration signals, in accordance with one or more embodiments.
Figure 12:
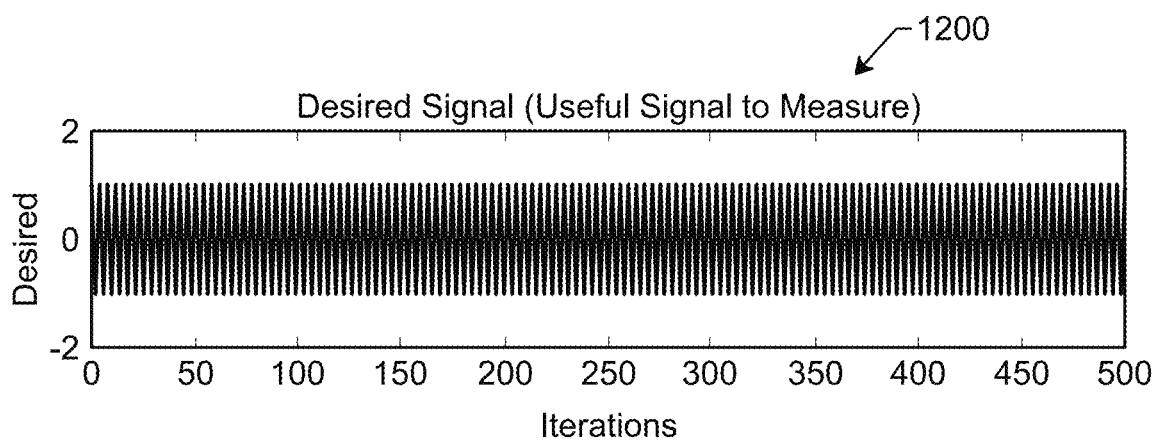

FIG. 11 through FIG. 13 show different vibration signals, in accordance with one or more embodiments. FIG. 11 shows the signal provided by the cantilever beam, including the uncorrelated noise. Thus, the raw signal (1100) is the signal generated by the sensor of FIG. 4, for example.

FIG. 12 shows the true signal (1200). The true signal (1200) is not directly measurable in a real circumstance. Rather, the true signal (1200) represents the signal the sensor of FIG. 4 would have generated, had the cantilever beam and the fluid been free of external vibrations. For purposes of experimentation, the true signal (1200) may be acquired in a laboratory, for example, and used as an ideal (i.e., "true") signal for a particular fluid expected to be present in a real circumstance. The true signal (1200) is useful as a reference to indicate the quality of the noise cancellation processes of the one or more embodiments.

FIG. 13 shows the filtered signal (1300). The filtered signal (1300) is an example of the output of the noise cancellation system (900) of FIG. 9, which receives the raw signal (1100) as the sensor signal (902) and the reference signal from the accelerometer in FIG. 4 as the accelerometer signal (904). The filtered signal (1300) may be used to determine the values of "f" and "Q," as described above. As can be seen, the filtered signal (1300) is significantly closer to the true signal (1200), relative to the comparison between the raw signal (1100) and the true signal (1200). Thus, the one or more embodiments improved the quality of the sensor signal by mitigating the effect of external vibrations on the sensor signal.

Figure 14:
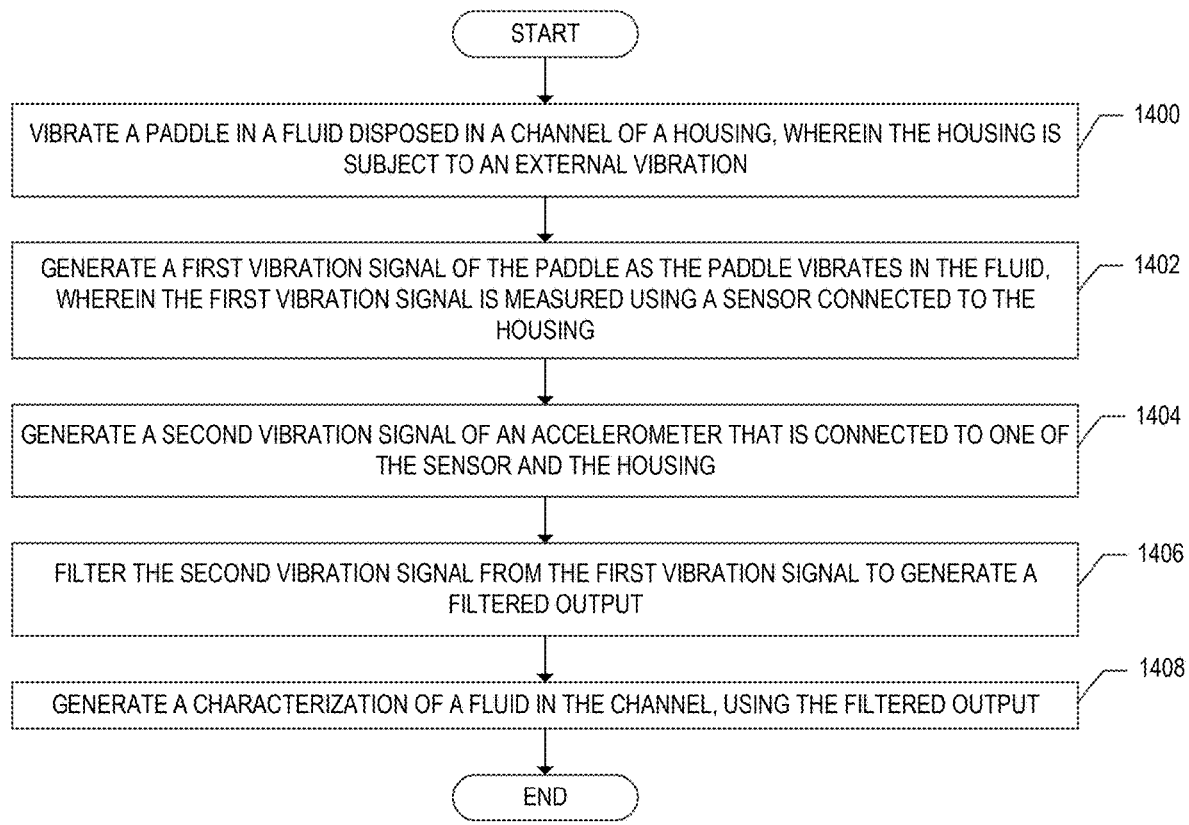
FIG. 14 shows a flowchart of a filtering method, in accordance with one or more embodiments.

FIG. 14 shows a flowchart of a filtering method, in accordance with one or more embodiments. The method of FIG. 14 may be performed using the devices described with respect to FIG. 1 through FIG. 4 and the signal processing techniques described with respect to FIG. 5 through FIG. 13.

Step 1400 includes vibrating a cantilever beam in a fluid disposed in a channel of a housing. The housing is subject to an external vibration. The cantilever beam may be vibrated using an actuator, as described with respect to FIG. 4.

Step 1402 includes generating a first vibration signal of the cantilever beam as the cantilever beam vibrates in the fluid. The first vibration signal is generated using a sensor connected to the housing, as described with respect to FIG. 4.

Step 1404 includes generating a second vibration signal of an accelerometer that is connected to one of the sensor and the housing. The second vibration signal of the accelerometer is generated as described with respect to FIG. 4.

Step 1406 includes filtering the second vibration signal from the first vibration signal to generate a filtered output. Filtering may be performed according to the process described with respect to FIG. 9 and FIG. 10. For example, referring to FIG. 9, filtering may be characterized as passing a second signal (e.g., the accelerometer signal (904)) through an adaptive filter (e.g., the adaptive filter (910)) to generate a correlated vibration signal (e.g., the error (912)) and subtracting the correlated vibration signal from the first vibration signal (e.g., the sensor signal (902)) to generate the filtered output (e.g., the output signal (914)). In an embodiment, the method may terminate after step 1406.

Step 1408 includes generating a characterization of a fluid in the channel, using the filtered output. Characterization of the fluid in the channel using the filtered output is described with respect to FIG. 6.

The method of FIG. 14 may be varied. For example, assume that the housing to which the sensor is attached is a component of a drilling tool. In this case, the method also includes performing a drilling operation with the drilling tool while vibrating the cantilever beam, generating the first vibration signal, generating the second vibration signal, and filtering. In other words, signal processing according to FIG. 9 and FIG. 10 may be performed dynamically without slowing a drilling operation. Thus, the one or more embodiments may increase the speed of drilling operations by avoiding the need to stop drilling in order to perform an analysis of the fluid in which the cantilever beam vibrates, even though the external vibrations caused by drilling may dominate the vibrations of the cantilever beam.

In another variation, the method of FIG. 14 may include the steps of generating the raw signal. For example, generating the first vibration signal at step 1402 may include exciting the cantilever beam to vibrate at an excitation frequency during an excitation phase, as shown in the excitation phase (502) of FIG. 5. Then the method also includes waiting a time period after exiting the cantilever beam, as shown in the delay phase (504) of FIG. 5. Then the method also includes generating the first vibration signal after the time period, as shown in the sensing phase (506) of FIG. 5.

Still other variations are possible. Thus, the one or more embodiments are not necessarily limited to the example of FIG. 14.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For example, two angles may be "about congruent" if the values of the two angles are within a first predetermined range of angles for one embodiment, but also may be "about congruent" if the values of the two angles are within a second predetermined range of angles for another embodiment. The ordinary artisan is capable of assessing what is an acceptable engineering tolerance for a particular product, and thus is capable of assessing how to determine the variance of measurement contemplated by the term "about."

As used herein, the term "connected to" contemplates at least two meanings, unless stated otherwise. In a first meaning, "connected to" means that component A was, at least at some point, separate from component B, but then was later joined to component B in either a fixed or a removably attached arrangement. In a second meaning, "connected to" means that component A could have been integrally formed with component B. Thus, for example, a bottom of a pan is "connected to" a wall of the pan. The term "connected to" may be interpreted as the bottom and the wall being separate components that are snapped together, welded, or are otherwise fixedly or removably attached to each other. However, the bottom and the wall may be deemed "connected" when formed contiguously together as a monocoque body.

The figures show diagrams of embodiments that are in accordance with the disclosure. The embodiments of the figures may be combined and may include or be included within the features and embodiments described in the other figures of the application. The features and elements of the figures are, individually and as a combination, improvements to the technology of vibrational sensors. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an inclusive "or" and, as such includes "and." Further, items joined by an or may include any combination of the items with any number of each item unless expressly stated otherwise.

In the above description, numerous specific details are set forth in order to provide a more thorough understanding. However, it will be apparent to one of ordinary skill in the art that the invention may be practiced without these specific details. In other instances, well-known features have not been described in detail to avoid unnecessarily complicating the description. Further, other embodiments not explicitly described above can be devised which do not depart from the scope as disclosed herein. Accordingly, the scope should be limited only by the attached claims.

What is claimed is:

1. A system comprising:
a sensor housing comprising an upper sensor housing and a lower sensor housing, wherein a channel is disposed between the upper sensor housing and the lower sensor housing;
a cantilever beam connected to a stem extending from the lower sensor housing and disposed within the channel;
an actuator located in an equipment cavity in the lower sensor housing, the actuator connected to the cantilever beam through the lower sensor housing and configured to cause the cantilever beam to vibrate;
a sensor connected to the cantilever beam and configured to generate a first signal representing a cantilever beam vibration of the cantilever beam;
a membrane formed from the lower sensor housing and disposed at the stem between the actuator and the cantilever beam such that the membrane and the lower sensor housing form a cavity within the lower sensor housing between the actuator and the stem, the cavity being disposed between the actuator and the cantilever beam, wherein the cavity has a toroidal shape in the lower sensor housing at the stem to reduce a mass of the lower sensor housing at the stem and decrease a vibration dampening effect of the mass of the lower sensor housing, and wherein the membrane transfers vibrations between the actuator and the cantilever beam through the stem;
an accelerometer secured to the lower sensor housing, the accelerometer configured to generate a second signal representing an external vibration of the lower sensor housing, wherein the external vibration changes the cantilever beam vibration; and
a signal processor configured to receive, as input, the first signal and the second signal and to generate, as output, a filtered signal that reduces an effect of the external vibration on the cantilever beam vibration.

2. The system of claim 1, wherein the signal processor comprises:
an adaptive filter configured to:
generate a measurement of the external vibration, and correlate the external vibration to the cantilever beam vibration to generate a correlated vibration signal; and
a signal adder configured to subtract the correlated vibration signal from the cantilever beam vibration.

3. The system of claim 1, further comprising:
a flow analyzer configured to take, as input, the filtered signal and to characterize, as output, a physical property of a fluid flowing through the channel.

4. The system of claim 1, wherein the cantilever beam is further connected to the membrane.

5. The system of claim 1, wherein the actuator is configured to cause the cantilever beam to vibrate at a first frequency in a lateral direction and at a second frequency in a transverse direction, wherein the first frequency is different than the second frequency.

6. The system of claim 1, wherein the actuator comprises a piezo-electric transducer.

7. The system of claim 1, wherein the sensor and the actuator comprise a single piezo-electric transducer.

8. The system of claim 1, wherein the accelerometer is connected to the sensor.

9. A system comprising:
a tool configured for insertion into a wellbore;
a sensor housing comprising an upper sensor housing and a lower sensor housing, wherein the sensor housing is connected to the tool, and wherein a channel is disposed between the upper sensor housing and the lower sensor housing;
a cantilever beam connected to a stem extending from the upper sensor housing or the lower sensor housing and disposed within the channel;
an actuator located in an equipment cavity in the lower sensor housing, the actuator connected to the cantilever beam through the lower sensor housing and configured to cause the cantilever beam to vibrate;
a sensor connected to the cantilever beam and configured to generate a first signal representing a cantilever beam vibration of the cantilever beam;
a membrane formed from the lower sensor housing and disposed at the stem between the actuator and the cantilever beam such that the membrane and the lower sensor housing form a cavity between the actuator and the membrane, the cavity being disposed between the actuator and the cantilever beam, wherein the cavity has a toroidal shape in the lower sensor housing at the stem to reduce a mass of the lower sensor housing at the stem and decrease a vibration dampening effect of the mass of the lower sensor housing, wherein the membrane transfers vibrations between the actuator and the cantilever beam through the stem;
an accelerometer connected to the sensor, the accelerometer configured to generate a second signal representing an external vibration of the lower sensor housing, wherein the external vibration changes the cantilever beam vibration; and
a signal processor configured to receive, as input, the first signal and the second signal and to generate, as output, a filtered signal that reduces an effect of the external vibration on the cantilever beam vibration.

10. The system of claim 9, wherein the signal processor comprises:
an adaptive filter configured to:
generate a measurement of the external vibration, and
correlate the external vibration to the cantilever beam vibration to generate a correlated vibration signal; and
a signal adder configured to subtract the correlated vibration signal from the cantilever beam vibration.

11. The system of claim 9, wherein the sensor housing is connected to a bay of the tool, and wherein the tool is part of a formation evaluation system.

12. The system of claim 9, further comprising:
a flow analyzer configured to take, as input, the filtered signal and to characterize, as output, a physical property of a fluid flowing through the channel.

13. The system of claim 9, wherein the cantilever beam is further connected to the membrane.

14. A method comprising:
vibrating, using an actuator, a cantilever beam in a fluid disposed in a channel of a sensor housing, wherein the sensor housing comprises an upper sensor housing and a lower sensor housing and the channel is disposed between the upper sensor housing and the lower sensor housing and is subject to an external vibration, wherein the cantilever beam is vibrated using an actuator;
generating a first vibration signal of the cantilever beam as the cantilever beam vibrates in the fluid, wherein the first vibration signal is generated using a sensor connected to the sensor housing, wherein a membrane is formed from the lower sensor housing and disposed between the actuator and the membrane such that a cavity is formed between the actuator and the membrane, the cavity being disposed between the actuator and the cantilever beam, wherein the cavity has a toroidal shape in the lower sensor housing at the membrane to reduce a mass of the lower sensor housing at the cantilever beam and decrease a vibration dampening effect of the mass of the lower sensor housing, wherein the membrane transfers vibrations between the actuator and the cantilever beam;
generating a second vibration signal of an accelerometer that is connected to one of the sensor and the sensor housing; and
filtering the second vibration signal from the first vibration signal to generate a filtered output.

15. The method of claim 14, further comprising:
generating a characterization of a fluid in the channel, using the filtered output.

16. The method of claim 14, wherein the sensor housing is a component of a tool, and wherein the method further comprises:
performing a drilling operation with the tool while vibrating the cantilever beam in the fluid, generating the first vibration signal of the cantilever beam as the cantilever beam vibrates in the fluid, generating the second vibration signal of the accelerometer, and filtering the second vibration signal from the first vibration signal.

17. The method of claim 14, wherein filtering the second vibration signal from the first vibration signal comprises passing the second vibration signal through an adaptive filter to generate a correlated vibration signal and subtracting the correlated vibration signal from the first vibration signal to generate the filtered output.

18. The method of claim 14, wherein generating the first vibration signal comprises:
exciting the cantilever beam to vibrate at an excitation frequency during an excitation phase;
waiting a time period after exciting the cantilever beam; and
generating the first vibration signal after the time period.

* * * * *